June 19, 1956  M. SANS  2,751,321
METHOD OF BUTT WELDING THERMOPLASTIC SHEETS
Filed April 21, 1953

INVENTOR.
MARCEL SANS

BY
ATTORNEY

# United States Patent Office 2,751,321
Patented June 19, 1956

2,751,321
METHOD OF BUTT WELDING THERMOPLASTIC SHEETS

Marcel Sans, Lyon-Villeurbanne, France, assignor to Societe de Constructions Mecaniques de Stains, Paris, France, a corporation of France Application April 21, 1953, Serial No. 350,190

Claims priority, application France Apr. 23, 1952

3 Claims. (Cl. 154—116)

This invention relates to the art of welding sheets or plates of thermoplastic material and more particularly to welding procedures wherein welding is applied by a bead of the same material which is inserted in a slot or groove between adjacent plates or sheets to be joined.

An object is to provide a novel and improved procedure for joining such materials.

Another object is to provide a welding bead of novel and improved configuration.

Various other objects and advantages will be apparent as the nature of the invention is more fully disclosed.

Synthetic thermoplastic materials have been found particularly useful in the construction of equipment for the chemical industry and may be employed in this field either alone or as a coating on other materials. Sheets, plates and the like of such material can be welded by melting the end of a weld bead of the same material by means of hot-air blow pipe and peening the softened material between the articles to be welded, which are in turn locally softened by the heat from the blowpipe. In welding thick plates, the edges of the two articles to be united are frequently oppositely bevelled so as to form a V-shaped groove which is filled by a number of superimposed strips of softened bead.

Heretofore, a round bead formed by an extruded strip of unplasticized thermoplastic material has been employed for this purpose. It is especially difficult to obtain tight joints when welding thick material and in order to pack the slot satisfactorily it is necessary to superheat the bead and the edges of the elements, whereby harmful stresses and local decomposition are produced.

Round beads are difficult to peen and a gap is left between them. Moreover, they are not very rigid and the operator experiences difficulty in positioning the beads.

Moreover, as a result of even slight decomposition of the heated material, gases and carbonaceous residues are formed. In the case of a round bead, these gases do not escape readily from the base of the groove or slot and the weld is therefore likely to be porous. The carbonaceous products remain embedded in the gap between the various weld beads and thus create the danger of leakage and low mechanical strength.

In accordance with this invention these various disadvantages are obviated in a particularly simple manner by using a flat weld bead which can be readily produced by extrusion, it merely being necessary to employ an extrusion nozzle having an aperture of rectangular, lenticular, trapezoidal or other form. A particular advantage of flat beads is that the heating by means of the blow pipe is more rapid and there is less danger of overheating. The flat bead may be produced with a fairly large gauge whereby it is given sufficient rigidity to enable the operator to handle it easily during the welding and to introduce the very soft mass into the recesses while applying a considerable pressure to the bevels of the walls of the elements to be welded. Thus the bevelled slots can be particularly readily filled by the superimposition of a plurality of strips.

The flat form permits the use of thicker beads and the filling of at least the wide slots and wide-angled slots with fewer layers without leaving gaps between the weld beads.

However, the bevelling of the elements to be joined is not essential, especially in the case of relatively thin plates which can be butt-jointed and readily welded by a single layer formed from a flat bead.

In order to join very thick plates, beads of increasing width may be provided, there being employed at the base an almost triangular strip, to which a wider bead is applied, followed by a still wider bead and so forth.

The use of flat beads is particularly advantageous if the cross section of such beads comprises at least one wide obtuse angle, for example of the order of 120° or more. For example, the cross section of the bead may be a triangle comprising an obtuse angle. It may also comprise, opposite this obtuse angle a surface which is not rectilinear as in the triangle, but is curvilinear or even of poygonal form, provided only that the transverse dimensions of the cross section are substantially larger than its perpendicular dimensions.

The nature of the invention will be better understood from the following description, taken in connection with the accompanying drawings in which specific embodiments thereof have been set forth for purposes of illustration.

Figure 1:
Fig. 1 is a section of a flat bead embodying the invention.
Figure 2:
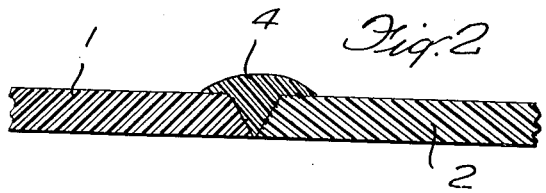
Fig. 2 is a sectional view illustrating the finished weld produced by the bead of Fig. 1.

Referring to the drawings more in detail, in Fig. 2 two plates 1 and 2 have been welded with a flat bead 4 as shown in Fig. 1. The bead has been softened, as by a blow pipe, and the adjacent edges of the plates 1 and 2 have been similarly softened and the bead peened into the shape shown.

Figure 3:
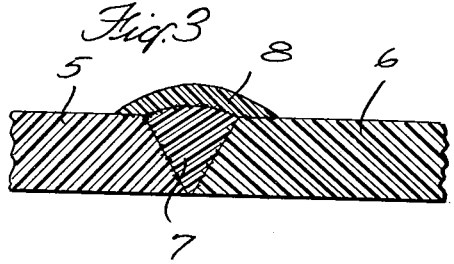
Figs. 3 and 4 are sections similar to Fig. 2, but illustrating a weld in thicker pieces of material produced by superimposing a plurality of flat beads.
Figure 4:
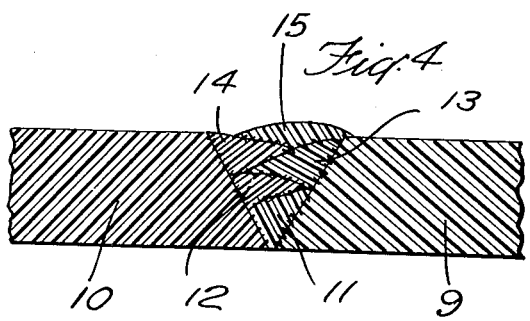

The welding of two thicker plates 5 and 6 with two successive strips of flat bead 7 and 8 is illustrated in Fig. 3, and the welding of two plates 9 and 10 of greater thickness by means of five successive strips 11, 12, 13, 14 and 15 of flat bead is illustrated in Fig. 4.

Figure 5:
Figs. 5 to 9 are sections similar to Fig. 1 illustrating welding beads of other cross sectional shapes.
Figure 6:
Figure 7:
Figure 8:
Figure 9:

In Fig. 5, the bead has a triangular cross section which has an angle at the apex of more than 120°. In Fig. 6, the form is similar, but the longer side is curvilinear, i. e. convex. In Fig. 7, the section is in the form of a very shallow diamond, and in Figs. 8 and 9 the section corresponds to polygons comprising an angle of more than 120°.

Figure 10:
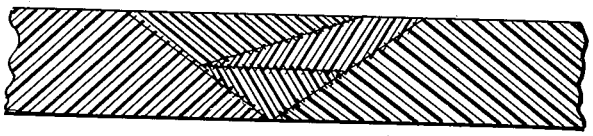
Figs. 10 is a section similar to Fig. 4 illustrating the use of a plurality of beads of different cross sectional shapes in a weld.
Figure 10:

Fig. 10 illustrates the use of beads of triangular cross-section for welding two thick plates.

The beads according to the present invention facilitate the guiding of the weld bead during its application. More particularly in the case of thick bevelled plates, it permits of more readily filling the space left for the weld, as will be seen from Figs. 4 and 10.

In the case of thin sheets, the beads according to the present invention afford at the same time great rigidity of assembly and a pleasing appearance even when the ridge formed by the weld has not been levelled off. Moreover, it will be seen that the guiding of the bead in the groove in which the weld must be deposited is greatly facilitated by the obtuse angle of the said bead. It will be obvious that the examples are in no way limitative and that the invention also covers any modification in the same spirit. Thus, while a plain bead will normally be employed, colored beads could be used to show the joints more clearly. The joints may remain untreated or may be levelelled by machining.

The invention is particularly applicable to the welding of sheets of polyvinyl chloride, using beads of unplasticized polyvinyl chloride that can be extruded readily and can be heated to softening temperature by the usual blow pipe or the like used in welding such materials.

The invention may be applied to various uses as will be apparent to a person skilled in the art.

What is claimed is:

1. The method of butt welding abutted sheets of synthetic thermoplastic material having a groove of V-shaped cross section therebetween to receive a welding bead, which comprises superimposing in said groove a plurality of beads of the same material but in unplasticized condition and in the form of thin strips having wide top surfaces and tapering toward the sides in cross section, heating said beads and the adjacent edges of the sheet material to softening temperature and peening the beads to cause them to fill said groove.

2. The invention set forth in claim 1 in which the beads are triangular in section.

3. The invention set forth in claim 1 in which the material is polyvinyl chloride.

References Cited in the file of this patent

UNITED STATES PATENTS

| | | |
|---|---|---|
| 1,899,067 | Trumbull | Feb. 28, 1933 |
| 2,004,037 | Criswell | June 4, 1935 |
| 2,392,734 | Haberstump | Jan. 8, 1946 |
| 2,430,076 | Pollock | Nov. 4, 1947 |
| 2,471,612 | Freeman | May 31, 1949 |
| 2,624,689 | Peters et al. | Jan. 6, 1953 |

FOREIGN PATENTS

| | | |
|---|---|---|
| 555,674 | Great Britain | Sept. 2, 1943 |
| 705,303 | Great Britain | Mar. 10, 1954 |
| 518,863 | Belgium | Apr. 15, 1953 |

OTHER REFERENCES

Modern Plastics, January 1951, pages 84–85.